Jan. 17, 1956   G. F. KIMBALL   2,730,803
ADJUSTABLE HEDGE AND TREE TRIMMING POWER SAW
Filed Oct. 1, 1954
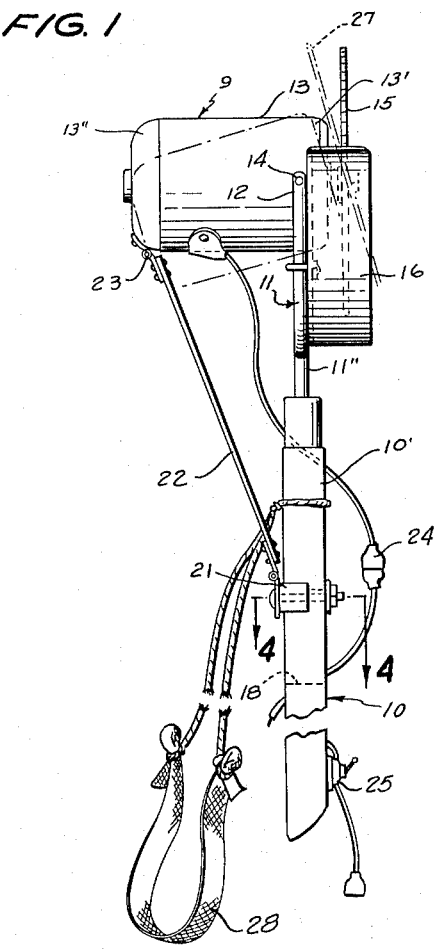
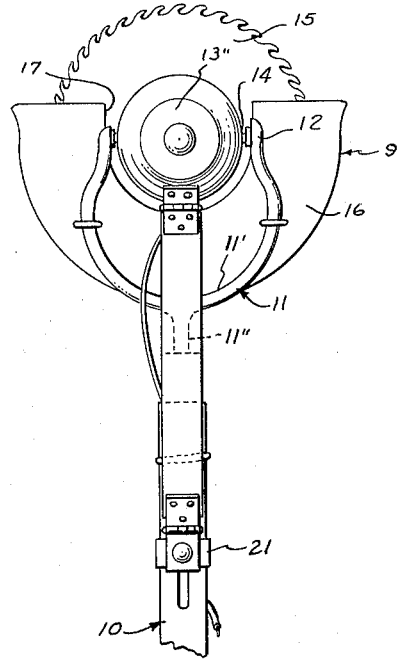
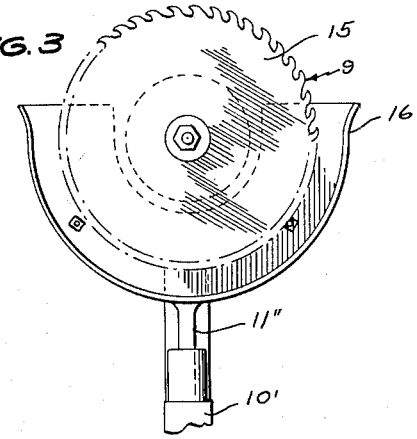
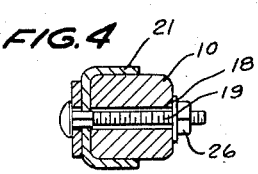
INVENTOR.
GEORGE F. KIMBALL
BY
McMorrow, Berman & Davidson
ATTORNEYS 2,730,803

ADJUSTABLE HEDGE AND TREE TRIMMING POWER SAW

George F. Kimball, Oceanlake, Oreg.

Application October 1, 1954, Serial No. 459,775

3 Claims. (Cl. 30—167)

The present invention relates to a portable electric saw for trimming trees and hedges.

The principal object of the present invention is to provide a portable electric hedge and tree trimming device in which the angle of rotation of the blade may be varied with respect to the supporting handle.

Another object of the present invention is to provide a hedge and tree trimming device having a fixed guard casing into which the saw blade is swingably movable from a position within the guard casing to a position outside of the guard casing.

A further object of the present invention is to provide a hedge and tree trimming device having an electric motor connected to the saw blade and being tiltable at the end of a handle so that the angle of cut of the saw blade may be varied with respect to the handle.

A still further object of the present invention is to provide a hedge and tree trimming device of sturdy and simple construction and one in which the depth of cut of the blade is limited only by the diameter of the blade with respect to the size of the motor.

These and other objects and advantages of the present invention will be fully apparent from the following description when taken in connection with the annexed drawings, in which:

Figure 1 is a side view in elevation of the present invention;

Figure 2 is an end view in elevation;

Figure 3 is another end view in elevation; and

Figure 4 is a vertical view in cross section on line 4—4 of Figure 1.

Referring in greater detail to the drawing, in which like numerals designate like parts throughout the several views, the invention consists in an adjustable hedge and tree trimming power saw, indicated generally by the reference numeral 9, and having a handle 10 and a U-shaped yoke 11 including a bight 11' and a pair of arms 12 projecting from the bight 11', and positioned relative to the handle 10 so that the bight 11' of the yoke 11 is adjacent one end 10' of the handle 10 with the arms 12 of the yoke projecting longitudinally away from the handle 10. The yoke 11 has a stem 11" on its bight 11' received in a bore formed in one end 10' of the handle 10.

A motor 13 having a forward end 13' and a rearward end 12" is positioned transversely of the yoke 11 with the portion adjacent the forward end 13' extending between the arms 12 of the yoke and connected by the pins 14 to those arms for pivotal movement from its transverse position, shown in solid lines in Figure 1, to a position at an angle with respect to the yoke.

The forward end 13' of the motor 13 carries a rotatable blade 15 spaced from the forward end of the motor and movable with the motor 13 into and out of the open side of the guard casing 16. The guard casing 16 has one closed side provided with a cut out portion indicated at 17 in Figure 2 through which projects the forward end of the motor 13.

As seen in Figure 4 the handle 10 is provided with a slot 18, at a point spaced from the one end of the handle adjacent the yoke, in which is slidable a bolt 19 carrying a bracket 21 which is hingedly connected to one end of a brace 22. The other end of the brace 22 is hingedly connected to the rearward end 13" of the motor 13 by a hinge plate 23.

Suitable disconnect plugs 24 and a switch 25 are provided for easy control of the motor 13.

As seen in Figure 1 the axis of rotation of the saw blade 15 is at right angles to the longitudinal axis of the handle 10. The bolt 19 and its nut 26 may be loosened with respect to each other so that the bracket 21 can be slid on the handle 10 permitting the motor 13 and blade 15 to be tipped to the dotted line position indicated at 27 in Figure 1.

A sling 28 is provided by means of which the one end of the handle 10 can be partially supported on a person for ease of operation of the device while trimming hedges or trees.

While only a single embodiment of the present invention has been here shown and described, other embodiments of the invention are contemplated within the scope of the appended claims without departing from the spirit of the invention.

What is claimed is:

1. An adjustable hedge and tree trimming power saw comprising a handle, a U-shaped yoke including a bight and a pair of arms projecting from said bight positioned so that the bight is adjacent one end of said handle with its arms projecting longitudinally away from said handle and having the bight fixedly secured to said one end of said handle, a motor having a forward end and a rearward end positioned transversely of said yoke with the portion adjacent the forward end thereof extending between the arms of said yoke, said forward end portion of said motor being connected to the arm of said yoke for pivotal movement from its transverse position to a position at an angle with respect to said yoke, a rotatable blade spaced from the forward end of said motor and carried by the forward end of said motor, and brace means connecting the rearward end of said motor to said handle at a selected point spaced from said one end of the latter.

2. An adjustable hedge and tree trimming power saw comprising a handle, a U-shaped yoke including a bight and a pair of arms projecting from said bight positioned so that the bight is adjacent one end of said handle with its arms projecting longitudinally away from said handle and having the bight fixedly secured to said one end of said handle, a motor having a forward end and a rearward end positioned transversely of said yoke with the portion adjacent the forward end thereof extending between the arms of said yoke, said forward end portion of said motor being connected to the arms of said yoke for pivotal movement from its transverse position to a position at an angle with respect to said yoke, a rotatable blade spaced from the forward end of said motor and carried by the forward end of said motor, and a brace having one end hingedly connected to the rearward end of said motor and having the other end hingedly connected to said handle at a point spaced from said one end of the latter for limited sliding movement therealong.

3. An adjustable hedge and tree trimming power saw comprising a handle, a U-shaped yoke including a bight and a pair of arms projecting from said bight positioned so that the bight is adjacent one end of said handle with its arms projecting longitudinally away from said handle and having the bight fixedly secured to said one end of said handle, a motor having a forward end and a rearward end positioned transversely of said yoke with the portion adjacent the forward end thereof extending between the arms of said yoke, said forward end portion of said motor being connected to the arms of said yoke for pivotal movement from its transverse position to a position at an angle with respect to said yoke, a rotatable blade spaced from the forward end of said motor and carried by the forward end of said motor, a bracket mounted on said handle at a point spaced from said one end of the latter for limited sliding movement therealong toward and away from said one end, and a brace having one end hingedly connected to the rearward end of said motor and having the other end hingedly connected to said bracket.

References Cited in the file of this patent

UNITED STATES PATENTS

| | | |
|---|---|---|
| 893,488 | Hall | July 14, 1908 |
| 1,336,078 | Hoover | Apr. 6, 1920 |
| 1,342,294 | Madere | June 1, 1920 |
| 1,816,966 | Gray et al. | Aug. 4, 1931 |
| 1,834,000 | McIntire | Dec. 1, 1931 |
| 1,871,606 | Haddad | Aug. 16, 1932 |
| 2,119,962 | Raleigh | June 7, 1938 |
| 2,239,297 | Allen et al. | Apr. 22, 1941 |